June 25, 1963
E. O. LARSON ETAL
3,095,073
APPARATUS FOR THE GUIDANCE OF GRANULAR
MATERIAL AND THE LIKE
Filed Nov. 20, 1961
2 Sheets-Sheet 1
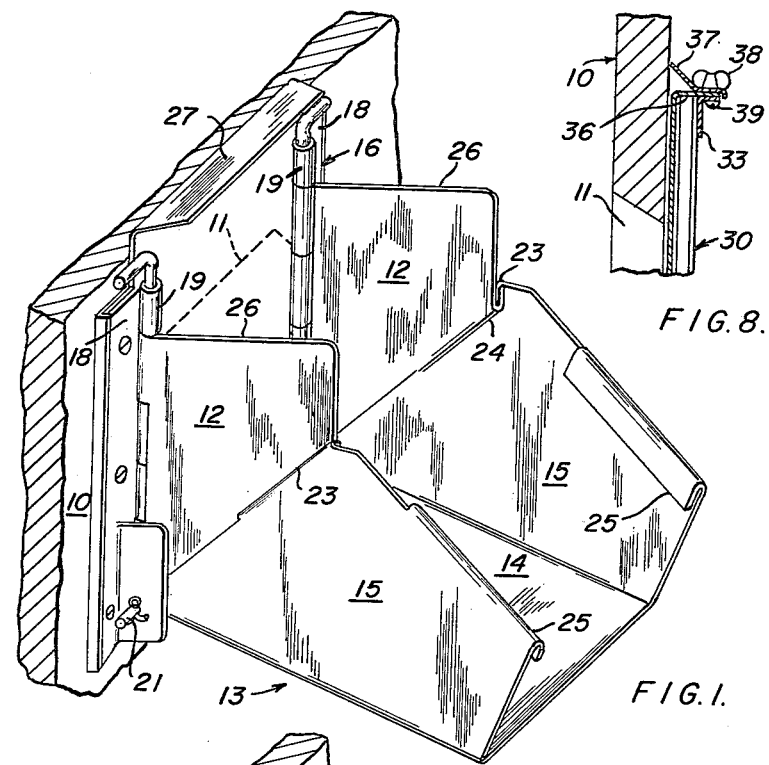
FIG. 8.
FIG. 1.
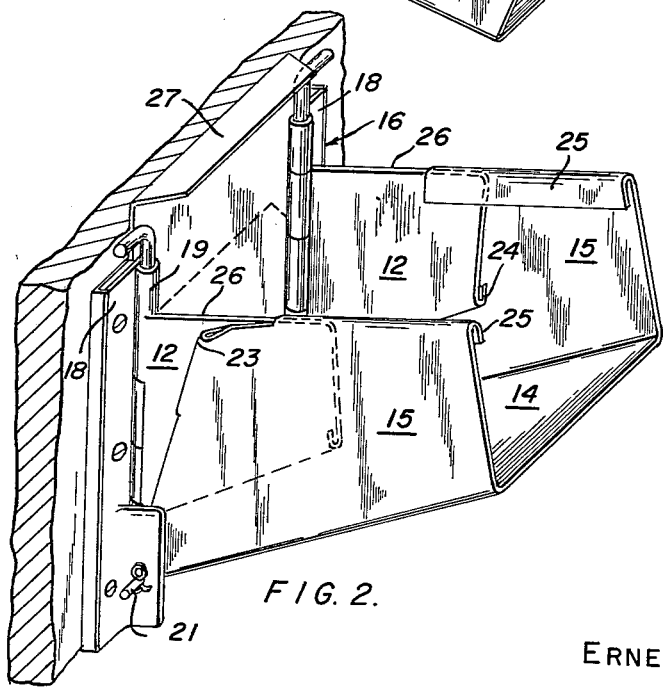
FIG. 2.
INVENTORS
ERNEST O. LARSON
ROY LARSON
BY *Featherstonhaugh & Co.*
ATTORNEYS.

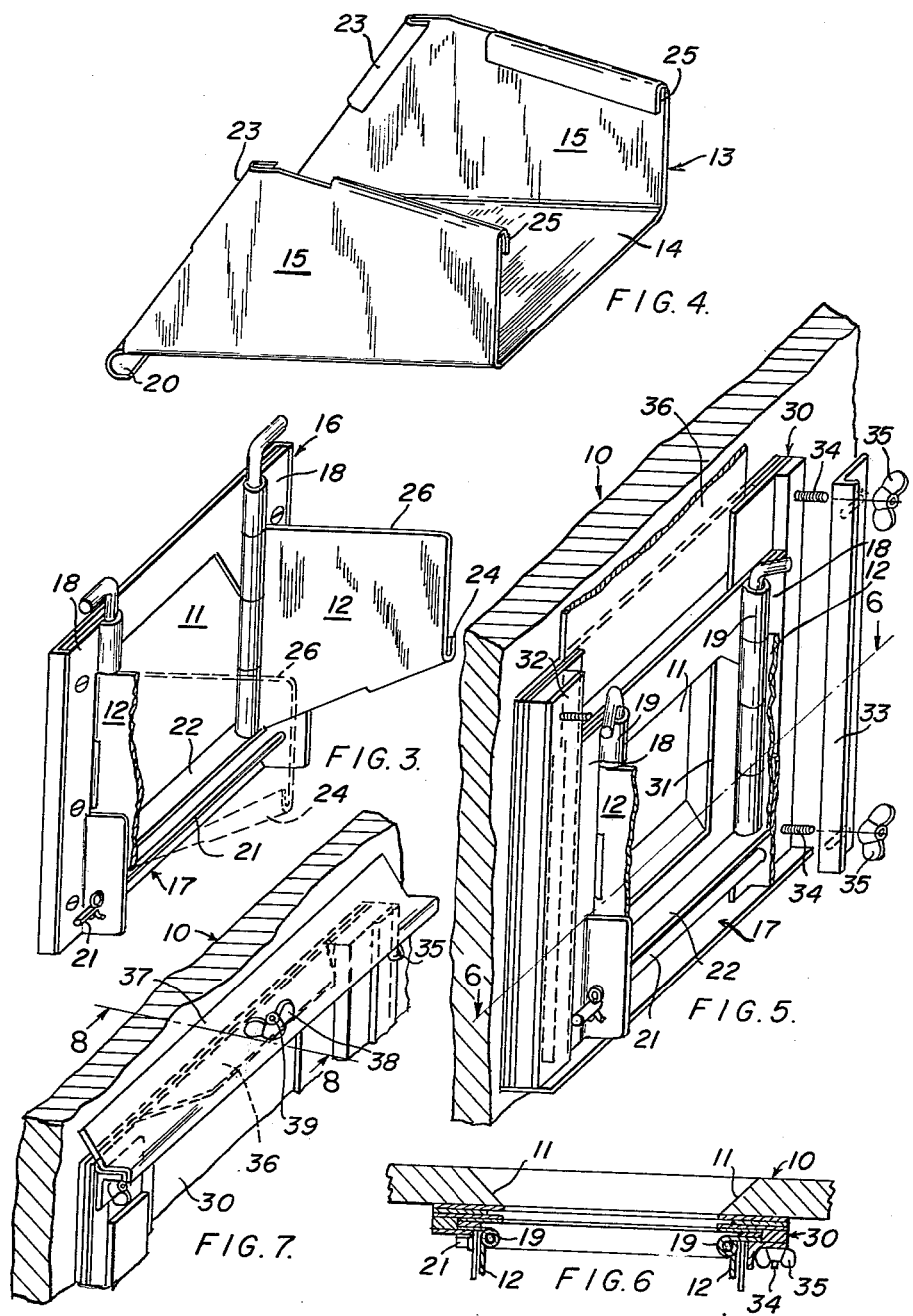

ically controlled by a slidable gate

United States Patent Office 3,095,073
Patented June 25, 1963

3,095,073
APPARATUS FOR THE GUIDANCE OF GRANULAR MATERIAL AND THE LIKE
Ernest Oscar Larson and Roy Larson, both of R.R. 1, New Norway, Alberta, Canada
Filed Nov. 20, 1961, Ser. No. 153,273
9 Claims. (Cl. 193—33)

This invention relates to apparatus for the guidance of granular material and the like emanating from an aperture located in a wall, and is of particular advantage for drawing grain from a granary by means of an auger.

When it is required to draw off a small quantity of grain from a granary at one time, it is advantageous to allow a small quantity of grain to flow into a container or if desired, into a hopper from where it is then removed by an auger. This can be accomplished in the conventional manner by using a downward sloping chute leading to the container or hopper. A slidable gate can then be used to control the rate and amount of grain flowing from the granary. When it is required to draw off a larger quantity of grain from a granary, it is also desirable to permit an auger to have full access to the granary.

Prior to our invention, no single apparatus was available that was capable of permitting a small quantity of grain to flow into a container or hopper when required, or permitting an auger to have full access to a granary for drawing off a larger quantity of grain. A conventional downward sloping chute was only capable of drawing off grain from a granary to feed a container or hopper. To give an auger full access to a granary, tubes of various lengths functioning as access chutes and having augers inserted in them have been used. These tubes were difficult and sometimes impossible to install in a full granary, and were impractical for drawing off a small quantity of grain. In order to empty the auger, it was first necessary to stop the motor operating the auger and then to remove the auger from the granary.

We have discovered that by detachably appending the side walls of a chute from a pair of support means adapted to project from the wall of a granary and positioned one on each side of an aperture in the wall, the floor of the chute may be made adjustable to assume at least two different angles with respect to the plane of the wall. In a first assumed angle, the floor of the chute may be adapted to extend in a downward sloping direction to permit the grain to flow into a container or a hopper. In a second assumed angle, the floor of the chute may be adapted to extend in an upward sloping direction to hold the grain in the chute and to permit an auger to be inserted into the granary to have full access to the granary.

When it is desired to draw off a small quantity of grain from the granary the floor of the chute is adapted to extend in the downward sloping direction leading to a hopper. With the auger inserted in the hopper for drawing off the grain, the auger may be emptied before stopping the motor, and the inconvenience of removing the auger from the granary is avoided.

For the support means, we prefer to use a pair of wings adapted to project from the wall with the side walls of the chute adapted to be detachably appended one from each wing and coplanar therewith. The floor of the chute is then adapted to bear against the wall below the aperture and may be adapted to be pivotally attached thereto to swing about a horizontal axis.

In the preferred embodiment of the invention about to be described, a mounting means is adapted to be fixed to the wall, and comprises a base portion adapted to be positioned below the aperture and a pair of side members extending from the base portion and adapted to be positioned one on each side of the aperture. The wings are mounted one on each of the side members and the side walls of the chute are adapted to be detachably appended from the wings in two positions by means on each side wall adapted to interengage with means on the lower portion of its associated wing for the first position, and by means on each side wall adapted to interengage with the upper edge of its associated wing for the second position.

The rate of and the amount of grain flowing from the granary is advantageously controlled by a slidable gate carried by the mounting means. By means of the slidable gate the forming of the aperture in the granary is facilitated without unnecessary loss of grain from the granary.

In another embodiment of the invention about to be described, versatility is imparted to the apparatus. For this purpose, a bracket having an aperture therein for the passage of grain is adapted to be fixed in advance to the wall of any one of a number of granaries. The bracket is adapted to support the mounting means and as can be readily appreciated, a single mounting means equipped with a chute may be used on any one of a number of granaries fixed with such a bracket. The bracket carries a slidable gate to control the amount of grain flowing from the granary and to close off the granary when not in use. This latter slidable gate would in this instance be used in lieu of the slidable gate carried by the mounting means.

Embodiments of the invention will now be described by the way of example, with reference to the accompanying drawings in which:

FIGURE 1 is a perspective view of the preferred embodiment of the invention with the floor of the chute shown in the downward sloping direction, FIGURE 2 is a perspective view of the apparatus of FIGURE 1 with the floor of the chute shown in the upward sloping direction and the slidable gate shown closed, the apparatus thus being arranged to receive an auger, FIGURE 3 is a view of the mounting means showing a pair of wings adapted to swing about a vertical axis and having interengaging means thereon, FIGURE 4 is a detailed view of the chute showing the interengaging means on the side walls thereof, FIGURE 5 is a partially exploded perspective view of another embodiment of the invention showing a bracket fixed to the wall of a granary and supporting the apparatus of FIGURE 1, FIGURE 6 is a sectional view taken along lines 6—6 of FIGURE 5, FIGURE 7 is a perspective view of the bracket of FIGURES 5 and 6 fixed to the wall of a granary and shown assembled when not in use to close off the granary, and FIGURE 8 is a sectional view taken along lines 8—8 of FIGURE 7.

Referring to FIGURES 1 to 4 of the drawings, there is shown a wall 10 of a granary having an aperture 11 formed in the wall. A pair of support means in the form of wings 12 are adapted to project from the wall 10 and are positioned one on each side of the aperture 11. A chute 13 having a floor 14 and a pair of side walls 15 is adapted to be detachably appended one from each wing 12.

As best shown in FIGURES 1 and 3, a mounting means 16 is provided for the wings 12 and the chute 13 and comprises a base portion 17 adapted to be positioned below the aperture 11 and a pair of side members 18 extending from the base portion 17 and adapted to be positioned one on each side of the aperture 11. The mounting means 16 may be conveniently fastened to the wall 10 by means of screws. As shown in the drawings, the base portion 17 is horizontally disposed and the side members 18 extend in an upright position, and as can be readily understood, other configurations of the mounting means 16 can be used depending on the shape of the aperture 11 and the shape of the chute 13. The wings 12 can be conveniently mounted on the side members 18 by hinges 19 so as to swing about a vertical axis. The floor 14 of the chute may be hooked by its curved front 20 (FIGURE 4) over a rod 21 fastened to the base portion 17 to swing about a horizontal axis. A lip 22 is carried by the base portion 17 and extends between the side members 18 to prevent leakage of grain at the front 20 of the floor 14.

The side walls 15 of the chute 13 are adapted to be detachably appended from the wings 12 in a manner such that the plane of the floor 14 is adjustable to assume at least two different angles with respect to the plane of the wall 10. This is accomplished by interengaging means 23, best illustrated in FIGURE 4, shown as downturned flanges on each side wall 15 of the chute 13 and adapted to interengage with interengaging means 24 best illustrated in FIGURE 3, shown as upturned flanges on the lower portion of the wings 12. In this position, the floor 14 of the chute 13 extends in a downward sloping direction (FIGURE 1) to permit the grain from the granary to flow into a container or a hopper which would be disposed below the chute 13. Interengaging means 25, best illustrated in FIGURE 4 and shown as downturned flanges on each side wall 15 of the chute 13, are adapted to interengage with the upper edge 26 (FIGURE 3) of the wings 12. In this second position, the floor of the chute 13 extends in an upward sloping direction (FIGURE 2) to permit an auger to be inserted into the chute 13 to have full access to the grain in the granary.

The mounting means is also equipped with a slidable gate 27 which is adapted to control the rate of and the amount of grain flowing through the aperture 11.

The apparatus may be easily installed on the wall 10 of a granary in the following manner:

The mounting means, comprising the base portion 17 and side members 18 with the wings 12 is first fastened by means of screws to the wall 10 of the granary, or if desired, to the holding boards inside the granary doors. The area of the wood enclosed by the mounting means is then drilled at the corners and sawed free. As the top section of the wood is tilted forward, the slidable gate 27 is pushed downward into grooves between the side members 18 thus shutting off the grain and avoiding the unnecessary loss of grain from the granary. The mounting means is then ready to receive the chute 13 which may be appended from the wings 12 in either the downward or upward sloping direction as required for the job that is to be performed. In the downward sloping position, an operator may choose to fill a container with grain or he may feed an auger by means of a hopper placed beneath the chute 13. In either case, the operator is in complete control of the rate and duration of flow of grain by means of the slidable gate 27. If it is desired that an auger be admitted into the granary, the chute 13 may be appended from the wings 12 in the upward sloping direction. In this position, the outflow of grain is prevented when the slidable gate 27 is raised. The auger may be admitted into the granary via the aperture 11. After the level of grain in the granary has been reduced sufficiently, the holding boards behind the granary door can be removed and the auger given free entry to the granary through the door.

Referring now to FIGURES 5 to 8, another embodiment of the invention is shown whereby versatility is imparted to the apparatus. A bracket 30 having an aperture 31 therein may be fixed to the wall of each of a number of granaries by means of screws. A single apparatus according to FIGURES 1 to 4 can then be conveniently mounted on any one of the brackets 30 in the following manner. The mounting means comprising the base portion 17 and side members 18 (less the slidable gate 27) is slipped under a holding plate 32 to fit snugly against the bracket 30. A slotted bar 33 is then fitted on bolts 34 and slid leftward over the right side member 18 and wing nuts 35 are tightened on the bolts 34. The mounting means is now securely in position and the procedure for using the apparatus is identical to that used in FIGURES 1 to 4 with the exception that a slidable gate 36 is carried by the bracket 30 for controlling the flow of grain through the aperture 31.

When the bracket 30 is not in use, as best shown in FIGURES 7 and 8, the slidable gate 36 is lowered to close the aperture 31. The slotted bar 33 is then mounted at the top of the bracket 30 and the wing nuts 35 are securely fastened on bolts. A drain plate 37 is mounted over the top of the slidable gate 36 and the slotted bar 33 and a wing nut 38 is securely fastened on a bolt 39 which passes through the drain plate 37, the bar 33 and the gate 36. With the bracket 30 thus mounted water is kept from entering the granary and the slidable gate 36 is securely closed against interference by animals.

Thus, according to the present invention, applicant has provided apparatus for guiding the flow of granualr material emanating from an aperture in a wall which has the advantages of adapting a floor of a chute in a downward sloping direction to permit the flow of granular material into a container or a hopper from where it may be augered, and in an upward sloping direction to hold the granular material in the chute, thereby permitting an auger to be inserted into the granary to have full access to the granular material.

What we claim as our invention is:

1. Apparatus for the guidance of granular material and the like emanating from an aperture located in a wall, comprising a pair of wings adapted to project from the wall, one positioned on each side of the aperture, a chute having a floor and a pair of side walls, the side walls of the chute being adapted to be detachably appended one from each wing in a first angular position of the floor of the chute with respect to the plane of the wall by means on each side wall adapted to interengage with means on the lower portion of its associated wing whereby the floor extends in a downward sloping direction, and in a second angular position by means on each side wall adapted to interengage with the upper edge of its associated wing whereby the floor extends in an upward sloping direction, the floor being adapted to bear against the wall below the aperture.

2. Apparatus as defined in claim 1, comprising mounting means adapted to be fixed to the wall and having a base portion adapted to be positioned below the aperture and a pair of side members extending from the base portion and adapted to be positioned one on each side of the aperture, the wings being mounted one on each of the side members.

3. Apparatus as defined in claim 2 including a bracket adapted to be fixed to the wall and having an aperture therein for the passage of granular material via the aperture in the wall, the bracket being adapted to support the mounting means.

4. Apparatus as defined in claim 3 including a slidable gate carried by the bracket and adapted to close the aperture in the wall.

5. Apparatus as defined in claim 2, wherein the wings are upright and adapted to be pivotally attached to the side members to swing about a vertical axis, the floor of the chute is adapted to be pivotally mounted on the base portion to swing about a horizontal axis, and the side walls of the chute are upright.

6. Apparatus as defined in claim 2 including a slidable gate carried by the mounting means and adapted to close the aperture in the wall.

7. Apparatus as defined in claim 1 wherein the wings are upright and adapted to be pivotally attached to the wall to swing about a vertical axis and the side walls of the chute are upright.

8. Apparatus as defined in claim 1 wherein the floor of the chute is adapted to be pivotally attached to the wall to swing about a horizontal axis.

9. Apparatus as defined in claim 1 wherein the interengaging means on each side wall and its associated wing for the first position of the chute comprise a downturned flange and an upturned flange respectively, and the interengaging means on each side wall for the second position of the chute comprises a downturned flange.

References Cited in the file of this patent

UNITED STATES PATENTS

| Re. 9,368 | Wood | Aug. 31, 1880 |
|---|---|---|
| Re. 24,000 | Saneholtz | May 10, 1955 |
| 882,605 | Young | Mar. 24, 1908 |
| 1,120,734 | Morling | Dec. 15, 1914 |
| 1,208,075 | Allsteadt | Dec. 12, 1916 |
| 1,536,642 | Wall | May 5, 1925 |
| 1,672,199 | Brown | June 5, 1928 |
| 1,688,600 | Slifer | Oct. 23, 1928 |
| 1,789,123 | Triggs | Jan. 13, 1931 |
| 1,881,003 | Wallace | Oct. 4, 1932 |
| 1,961,307 | Stauffer | June 5, 1934 |
| 2,025,702 | Anderson | Dec. 31, 1935 |
| 2,675,947 | Wynn | Apr. 20, 1954 |